Oct. 18, 1966                D. BASMADJIAN ETAL                3,279,153
                   PROCESS FOR THE SEPARATION OF GASES BY ADSORPTION
Filed July 8, 1963                                                    4 Sheets—Sheet 1

FIG. 1

INVENTOR:
DIRAN BASMADJIAN
LOUIS AUGUST POGORSKI
BY: Cavanagh & Norman

FIG. 2

INVENTOR:
DIRAN BASMADJIAN
LOUIS AUGUST POGORSKI

BY: *Cavanagh & Norman*

3,279,153
PROCESS FOR THE SEPARATION OF
GASES BY ADSORPTION
Diran Basmadjian, Ottawa, Ontario, and Louis August Pogorski, Toronto, Ontario, Canada, assignors to Chemical Projects Limited, Toronto, Ontario, Canada
Filed July 8, 1963, Ser. No. 293,533
22 Claims. (Cl. 55—58)

This invention relates generally to an improved method for concentration and separation of gases from gas mixtures by adsorption. More particularly it is directed to an improved method for concentration and separation of low boiling gases such as helium hydrogen and neon from natural or artificial mixtures of relatively higher boiling gases such as, for example gas from the dry oil wells, natural gas, and industrial off gases.

In the chemical industry it is frequently desired to concentrate or separate low boiling gases having a normal boiling point of about —400° F. and less (henceforth referred to as light component or components of a gas mixture) such as helium, hydrogen and neon from the relatively high boiling gases having a normal boiling point of about —300° F. and upwards (henceforth referred to as heavier component or components of said gas mixture) such as nitrogen, oxygen, the rare gases, methane and light hydrocarbons, oxides of carbon, nitrogen, gaseous organic or inorganic compounds of carbon, sulfur, chlorine, or any natural or artificial mixture of any gaseous components. In some instances the component or components to be concentrated or recovered constitute a very minor proportion of the total gas mixture (e.g. helium, in natural gas or in a gas from dry oil wells representing on the average less than 3%), in others it can be considerably greater (e.g. hydrogen in refinery off gas, coke oven gas, reformed gas and the like).

The conventional methods applicable for the concentration or separation of these components are adsorption, absorption, diffusion and condensation of the component or components followed by low temperature fractionation. Frequently a combination of more than one of the above methods may be required to achieve satisfactory results. Some such methods require at one stage or another a substantial reduction in the temperature of the gas mixture being concentrated which requirement seriously detracts from the economics of the methods. Thus far the industrial application of selective adsorption has been practically and economically limited to cases in which the adsorbed component or components represent a minor percentage of the total gas mixture (e.g. separation of heavier components from natural gas or removal of traces of undesirable impurities from process gas streams).

In the case of gas mixtures containing a high concentration of sorbable components reaching up to 99% or more of the total feed volume, near-complete saturation of the bed results immediately upon the initial admission of the feed gas to the vessel. It then becomes necessary to recover the desired enriched light product residing entirely in the gas phase of the bed, without causing desorption of the heavy components or any substantial dilution of the desired product. Methods to this end proposed in the past all tend to dilute the product stream, or parts of it, to a degree which renders these processes uneconomical. One such procedure, embodied in British Patent 860,311, proposes the recovery of the enriched gas phase by depressurizing the adsorbent bed and collecting a relatively minor fraction of enriched gas. The remainder of the gas, constituting 60–90% of the total feed, contains 15% or more of the light component at concentrations far below the feed composition. This latter fraction may be discarded or recycled for further processing.

It is therefore the main object of this invention to provide an improved process for efficient and economical separation of a desired light component or components constituting a minor proportion of a gaseous feed mixture from the heavier component or components constituting the major proportion of said feed mixture.

It is another object of this invention to provide an improved process for the efficient and economical concentration of light components such as helium, hydrogen and neon in a gaseous feed mixture of heavy and light components having a greater proportion of heavy components than of light components.

It is another object of this invention to provide an improved process for the efficient and economical separation of light components such as helium, hydrogen and neon from heavy components in a gaseous feed mixture of heavy and light components having a greater proportion of heavy components than light components.

It is another object of this invention to provide an improved process for the efficient and economical concentration of light components such as helium, hydrogen and neon in a gaseous feed mixture of heavy and light components having a greater proportion of heavy components than of light components by preferential adsorption of said heavy components.

It is another object of this invention to provide an improved process for the efficient and economical separation of light components such as helium, hydrogen and neon from heavy components in a gaseous feed mixture of heavy and light components having a greater proportion of heavy components than light components by preferential adsorption of said heavier components.

It is another object of this invention to provide an improved process utilizing a displacement-pressure swing cycle for the efficient and economical concentration of light components such as helium, hydrogen and neon in a gaseous feed mixture of heavy and light components having a greater proportion of heavy components than of light components by selective adsorption of said heavy components at temperatures approaching the temperature of said feed mixture.

It is another object of this invention to provide an improved process utilizing a displacement-pressure swing cycle for the efficient and economical separation of light components such as helium, hydrogen and neon from heavy components in a gaseous feed mixture of heavy and light components having a greater proportion of heavy components than of light components by selective adsorption of said heavy components at temperatures approaching the temperature of said feed mixture.

It is another object of this invention to provide an improved process for efficient and economical separation of light components such as helium, hydrogen and neon from heavy components in naturally occurring gas mixtures from underground gas wells having a greater proportion of heavy components than of light components by treatment of said mixtures under conditions of temperature and pressure substantially similar to those under which said mixtures exist in said wells to preferentially adsorb said heavy components.

It is another object of this invention to provide an improved method for efficient and economical concentration of light components such as helium, hydrogen and neon in naturally occurring gas mixtures of heavy and light components having a greater proportion of heavy components than of light components by treatment of said mixtures under conditions of temperature and pressure substantially similar to those under which said mixtures exist in said wells to preferentially adsorb said heavy components.

It is another object of this invention to provide an improved process for efficient and economical separation of light components such as helium, hydrogen and neon from heavy components in naturally occurring gas mixtures from underground wells having a greater proportion of heavy components than of light components by adsorption of said heavy components, said process being adapted to accommodate said gas mixtures without substantial conditioning thereof in respect of temperature and pressure.

It is another object of this invention to provide an improved process for efficient and economical concentration of light components such as helium hydrogen and neon in naturally occurring gas mixtures from underground wells having a greater proportion of heavy components than of light components by adsorption of said heavy components, said process being adapted to accommodate said gas mixtures without substantial conditioning thereof in respect of temperature and pressure.

The above and other objects of the invention may be accomplished, in general, by preferential adsorption of the heavier component or components of a gas mixture in a fixed bed adsorption apparatus employing a combination displacement-pressure swing cycle, operating at substantially the temperature of the gas mixture introduced into said bed, consisting of three basic steps, namely:

Step 1.—High pressure adsorption of the undesired heavy component(s).

Step 2.—Displacement of the light component(s) enriched product by a displacement fluid consisting principally of the heavier component(s).

Step 3.—Regeneration of the absorbent by the pressure swing method.

From the experience gained in experiments related to the present invention, it has ben found that the said displacement technique constitutes the most economical method of recovering the desired product.

The invention in certain of its aspects is based on the difference in the ability of various gases to become preferentially adsorbed within the pore structure of the suitable adsorbents such as activated carbon, charcoal, activated alumina, silica gel, natural or artificial zeolites, and the like. The ability of a gas to become adsorbed is affected by many factors such as the pore size and structure of the adsorbent, the size of the gas molecules, boiling point and partial pressure of said gas, operating conditions, etc. In general, it may be said (although it is not necessarily true in all the cases) that the higher the boiling point of a given gas the greater is its tendency to become adsorbed on an adsorbent and vice versa, the lower the boiling point the lesser is its tendency to become adsorbed. If the differences in the ability to become adsorbed under given conditions are large enough the concentration or separation of a light component or components from heavier component or components when carried out in a suitable type of an apparatus can be both efficient and economical.

For example, the average experimental helium enrichment ratios obtained during the concentration of helium (light component) in helium-nitrogen (heavy component) mixtures by the method and in the apparatus described below was in the range of 1.5–3.5 per stage while the helium losses were kept at approximately 2% per stage or less.

In the first step referred to above a feed gas mixture consisting of light and heavy gaseous components in the aforesaid relative proportions is prepurified of any liquids and long chain gaseous hydrocarbon contaminants in suitable purification apparatus and is then introduced into a column containing a granular, pelleted or performed adsorbent material (activated carbon, charcoal, activated alumina, artificial or natural zeolites, or any other brand name adsorbent). Prepurification of the gas of liquids and long chain gaseous hydrocarbons, where necessary is to be preferred for otherwise these components may be taken up in the adsorbent material with consequent reduction in the efficiency of the same. Initial column pressure may range from partial vacuum (1 p.s.i.a. or less) up to above atmospheric pressure and the gas is admitted until the pressure in the adsorber is approximately equal to that of the feed. As the adsorption isotherms of the heavy components essentially level off at pressures above about 1500 p.s.i.g. it has been found economically expedient where the gas feed is available at pressures substantially in excess of about 1500 p.s.i.g. to reduce the feed to approximately that pressure to eliminate the need for more costly apparatus able to withstand the higher pressures. With operating pressures below about 200 p.s.i.g. the economic practicability of the process becomes less attractive due to the relatively low capacity of the adsorbent at such pressures. During this step, the heavier component or components are preferentially adsorbed by the adsorbent.

Due to the adsorption of the heavier component or components in step 1, the gas contained in the bed void space becomes enriched in the light component(s). To recover this gas, one or more of the adsorbable heavier components are introduced from a storage tank via a recycling unit, displacing the light component(s) enriched product to the product line or to the second stage adsorption for further enrichment. In some cases it may be economically justified to recirculate a part of the enriched product around a given stage to preconcentrate the feed to that stage.

The final step consists in restoring the column to its original state. The column is vented to the atmosphere or evacuated, part of the gas being recompressed and returned to a recycling system for subsequent use as the displacement agent. If so desired the vented gas may be recovered for further use or processing.

The adsorption process can be carried out in one adsorption column or a number of adsorption columns connected in parallel. Each individual adsorption column or group of columns connected in parallel as the case may be represents one adsorption stage. Several adsorption stages may be connected and operated in series until the desired degree of concentration or separation of the light component(s) is reached.

The above and other objects and advantages of the invention will become apparent from a consideration of the following detailed description of preferred embodiments thereof in conjunction with the accompanying drawings in which.

Whereas the essential components, such as lines, tanks, compressors, and valves are shown on the above diagrams, the instruments, auxiliary valves, pumps, traps, and the like are not shown since their use and disposition will be obvious to those skilled in the art.

Figure 1:
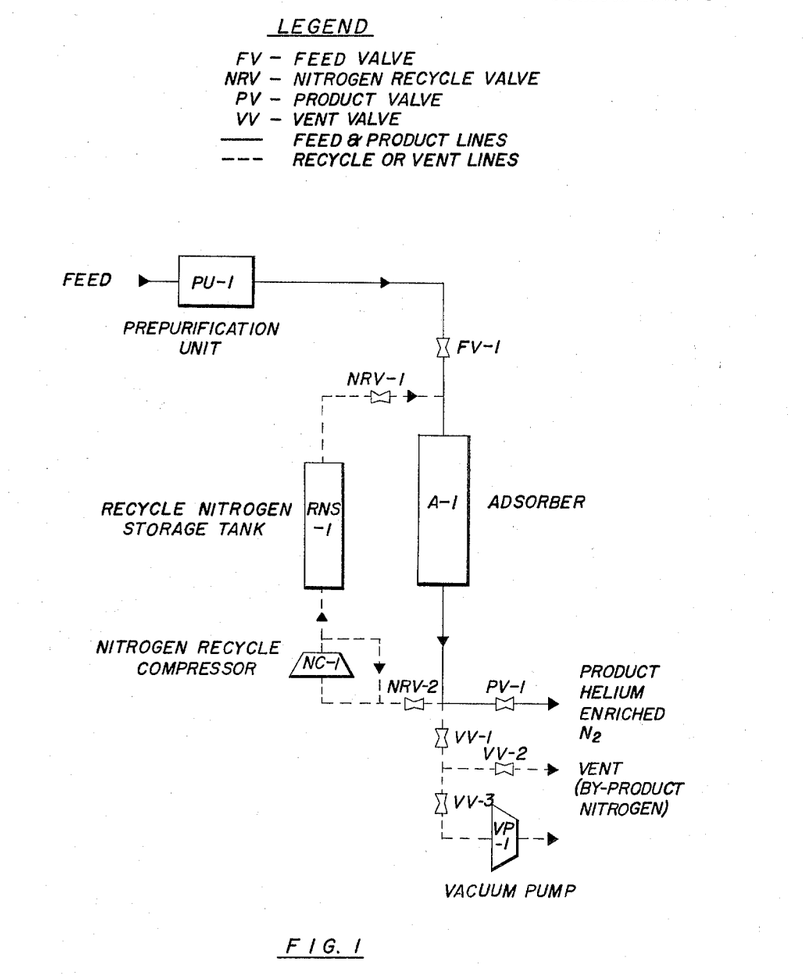
FIGURE 1 is a schematic illustration of the basic embodiment of the gas concentration and separation apparatus for use in accordance with this invention showing a typical single bed concentration stage without product recirculation.

The concentration and separation of a light component from the bulk of heavier component(s) of a gas mixture is illustrated by a typical example involving separation of helium (light component) from a natural helium-nitrogen (heavy component) mixture and described in reference to FIGURE 1. A mixture of helium and nitrogen, such as occurs in certain underground gas fields (e.g. gas from dry oil wells of Western Canada), containing for the most part nitrogen (usually 95–99%) and available at pressures of up to 1500 p.s.i. and higher (usually 600–1500 p.s.i.) and temperatures between about 200° F. and −40° F. is preferably purified of liquid and long chain gaseous hydrocarbon contaminants which might deleteriously affect an adsorbent medium in a prepurification unit (PU–1) consisting of coolers, scrubbers, adsorbers, adsorption beds, etc., or any combination of said equipment. The purified dry gas is subsequently fed at the then prevailing temperature of the gas into an apparatus consisting of an adsorption unit containing a solid adsorbent and operating on a three-step cyclic sequence. A schematic diagram showing a typical concentration stage representing a basic unit of the gas concentration and separation apparatus is given on FIGURE 1. All the valves indicated on the diagram are considered closed at the beginning of the cycle and the adsorbent bed regenerated and ready for operation. The flow directions are represented by the arrows.

*Step 1.—High pressure adsorption of the undesired heavier component (nitrogen)*

Adsorber A–1 at atmospheric or subatmospheric pressure receives the prepurified dry high pressure feed gas (at the then prevailing temperature of the gas) through valve FV–1. As the gas flows downwards into the bed, the undesirable component, nitrogen, is adsorbed from the mixture resulting in a helium-enriched gas in the bed void space. Adsorption is allowed to continue until the pressures have been approximately equalized with that of the feed or if so desired for a predetermined and adjustable period of time.

*Step 2.—Displacement of the light component (helium) enriched product by a displacement fluid*

Valve FV–1 is closed and valves NRV–1 and PV–1 are opened to admit nitrogen from the recycle nitrogen storage tanks RNS–1 which displaces the gas from the bed void space into the product stream line and from there, if desired, to the next stage. During this step, pressures throughout the column remain approximately the same as at the end of step 1. The displacement is continued until the helium concentration of the effluent gas drops below a desired value, which value is higher than the concentration of helium in the feed gas.

*Step 3.—Regeneration of the adsorbent by the pressure swing method*

The final step involves regenerating of the adsorbent and restoring the equipment to its original state as it was at the beginning of the cycle. Valve PV–1 and NRV–1 are closed and valve NRV–2 opened. Recirculating nitrogen compressor NC–1 is started up to remove nitrogen from the bed. As the pressure drops, the nitrogen adsorbed on the adsorbent desorbs. Desorbed nitrogen flows from the bed into the compressor NC–1 where it is recompressed to a pressure above that of the feed gas and stored in the recycle nitrogen storage vessel RNS–1. A volume of nitrogen equivalent to approximately 30% of the feed volume per cycle should be stored in the storage vessel RNS–1 at sufficiently high pressure to be available for displacement of the product. When the pressure in the bed has dropped to a predetermined value (or alternatively when a given amount of gas has been pumped into the storage tank RNS–1) the valve NRV–2 is closed and the vent valves VV–1 and VV–2 are opened. The remaining nitrogen is vented to the atmosphere or to the by-product recovery system. Finally, if economic considerations make it desirable, valve VV–2 is closed, valve VV–3 is opened and vacuum pump VP–1 is used to reduce the pressure in the adsorber to some desired level (usually about 1–2 p.s.i.a.). Upon completion of the desorption all the valves are closed and the system is ready for the next cycle. In certain cases, it may be found desirable to vent the adsorption bed to an intermediate pressure between the feed pressure and the atmospheric pressure.

Several stages as described above can be connected in series to permit attaining any desired degree of enrichment ranging in magnitude from the initial concentration of the light component (e.g. helium in the feed gas) up to substantially 100%. Due to the attractive operating conditions (i.e. temperature which seldom is below about −40° F.) permitting the use of cheap materials of construction such as carbon steel, the capital and operating costs of the gas concentration and separation methods and systems subject of this invention are in general considered more economical than those of the previously proposed methods.

In some cases depending on various considerations it may be found advantageous and economical to preconcentrate the original gas feed having a low helium content to an intermediate concentration (e.g. 30–70% helium) by the methods described in this invention and carry out the final concentration step by other methods, e.g. low temperature fractionation. Such tying in of the two methods would be particularly attractive and economical for increasing the capacity of the existing low temperature helium recovery plants. The vent gas from the helium preconcentration unit can be condensed on expansion to form a low cost liquid by-product(s) (e.g. nitrogen, methane, light hydrocarbons or the like).

The individual stages of a multistage adsorption plant are identical in principle but differ in size, decreasing as a function of the enrichment. The enrichment per stage is of the order of 1.5–3.5 and may vary from stage to stage. The product losses can be usually kept at under 2–3% per stage.

Both the enrichment factor per stage and the recovery are affected by such factors as feed composition, size and design details of the adsorption column, type of the adsorbent, type of packing, direction of gas flows within the bed, gas velocity, length of the cycle, operating pressures and temperature and other variables of the system.

A modification of the previously described system will permit to keep the product enrichment ratios at a maximum and the product losses at a minimum level. This modification involves recirculation of the end portion of the product of any individual stage too lean to be included in the final product of said stage and too rich to be rejected as waste around said stage.

In some cases it may be found both advantageous and economical to recirculate a part of the product during the first stage while in other cases it would be incorporated only in the higher stages.

Figure 2:
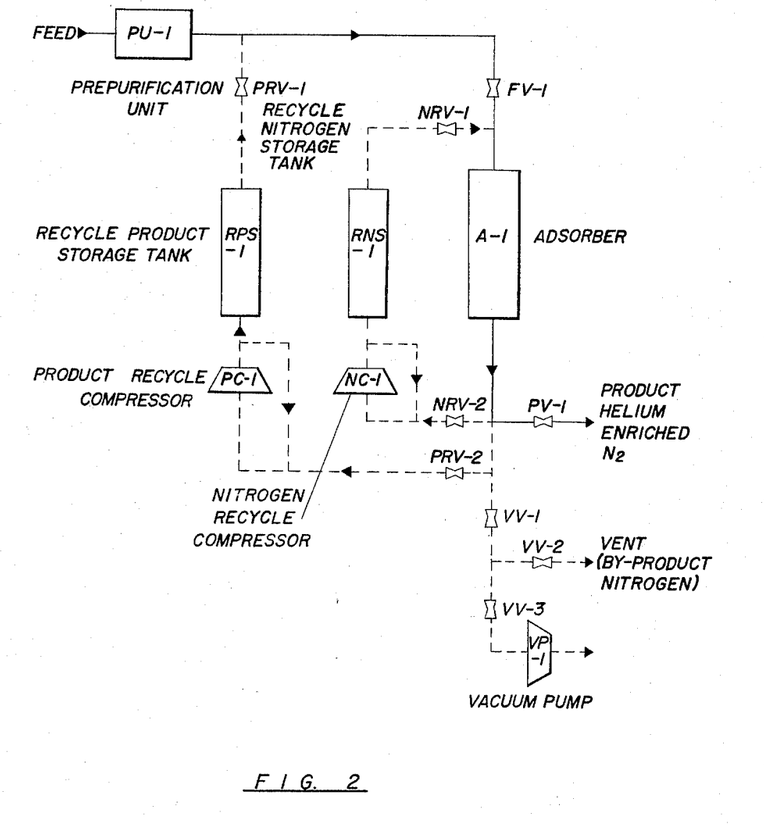
FIGURE 2 is a schematic illustration of the apparatus of FIGURE 1 adapted for product recirculation.

The enrichment and the method of operation of a typical adsorption stage with product recirculation is represented on FIGURE 2. The apparatus represented on FIGURE 2 is identical with the apparatus represented on FIGURE 1 with the exception that the product recirculation lines, the product recirculation compressor PC–1 recycle product surge tank RPS–1, and the product recirculation control valves PRV–1 and PRV–2 are added. The operation is identical with the method described in reference to FIGURE 1 except for the following:

*Step 1a.—High pressure adsorption of undesired heavy component(s)*

As in step 1, except valves PRV–1 and PRV–2 are closed.

*Step 2a.—Displacement of light component(s) enriched product by a displacement fluid*

Valve FV–1 is closed and valves NRV–1 and PV–1 are opened to admit nitrogen from the storage tank NRS–1 and displace the enriched gas from the bed void space into the product stream line and from there to the next stage. During this step, pressures throughout the column remain approximately the same as at the end of step 1. At an appropriate point when the concentration of helium in the enriched product drops below a desired level (usually a composition slightly higher than that of the feed selected in such a way that the average concentration of the desired product (helium) in the enriched recycle is equivalent to the concentration of the feed to said stage), valves PRV-1 and PRV-2 are opened, product recycle compressor PC-1 started up and the enriched recycle stream recycled to the adsorber inlet upstream of valve FV-1.

*Step 3a.—Regeneration of the adsorbent by the pressure swing method*

Valves PRV-1 and PRV-2 are closed and the step continued as described previously in step 3.

An important criterion of the length of the cycle is the maximum permissible flow rate within the bed. This rate should be high enough but not excessive in order to allow a reasonably short cycle while keeping the attrition of the adsorbent at a minimum. In general the cycle time will vary from system to system as the function of the size of the adsorption bed, adsorbent characteristics and of the operating conditions and may range from 10–60 minutes. A typical cycle may run as follows:

|  | Minutes |
|---|---|
| Introduction of feed and adsorption | 13 |
| Displacement of product with nitrogen | 4 |
| Desorption of the bed | 13 |

The valves should preferably open and close gradually to avoid sudden pressure surges which might result in excessive adsorbent attrition.

The operation of an adsorption stage made up of a single adsorption unit as represented on FIGURES 1 or 2 is not continuous as the feed to the adsorber is supplied during a part of the cycle, the rest of the period being used for such function as displacement of the enriched product and desorption.

Figure 3:
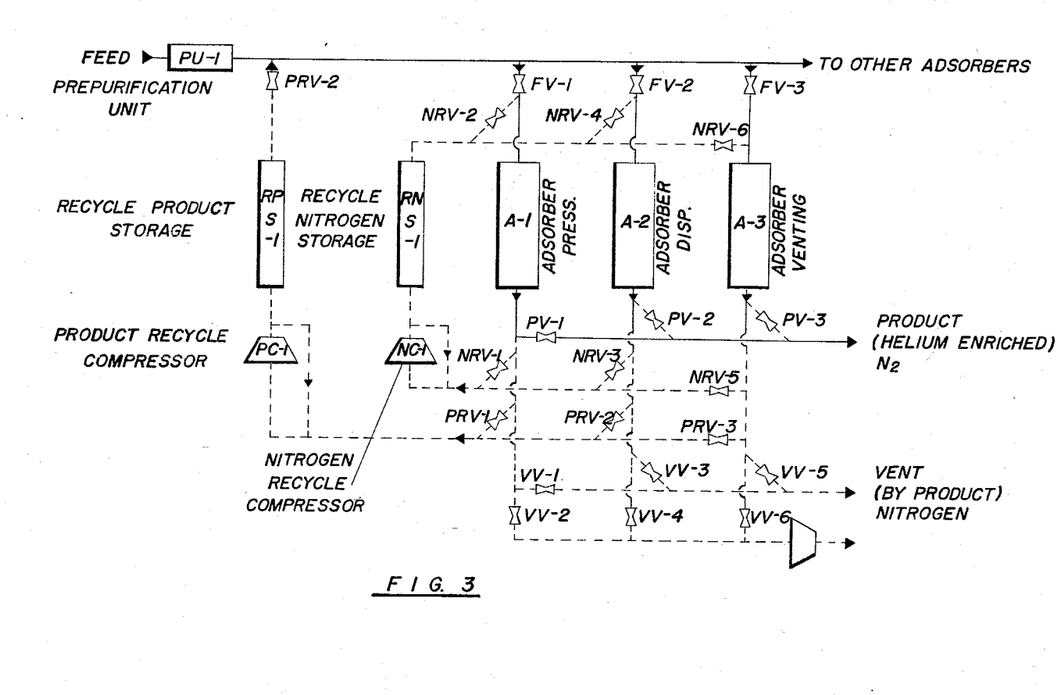
FIGURE 3 is a schematic illustration of a multi-bed concentration stage for continuous concentration of the feed gas mixture, and, FIGURES 4a and 4b are schematic illustrations of a system for lateral feed of the gas mixture into the concentration stage.

In a modified version of the previously described system, the operation of each stage can be made continuous by incorporating several adsorption units within one stage and connecting them in parallel. FIGURE 3 represents a typical stage made up of 3 basic adsorption units as represented on FIGURE 2 and connected in parallel. The cycle and the method of operation of each unit is identical with that described previously in reference to FIGURES 1 and 2. The difference lies in the fact that the cycles for adsorbers A–1, A–2 and A–3 are shifted in time. For example, Step 1, high pressure adsorption of the heavier component(s), takes place in adsorber A–1 while Step 2, displacement of the enriched product, takes place in adsorber A–2 and Step 3, desorption of the adsorbent, in adsorber A–3.

Another modified system may be employed to improve the product enrichment ratio and increase the space efficiency of the bed by employing a lateral feed technique. During the first step of the basic cycle (high pressure adsorption of the heavier component(s)) the void space becomes gradually enriched in the light component(s). The adsorption rate of the heavier component gradually decreases as the adsorbent becomes saturated with the adsorbable components. As the pressure in the bed increases and the rate of adsorption of the heavier component decreases the continued flow of feed compresses the enriched gas which filled the void space during the initial phases of the process against the bottom of the bed. The combination of the above two effects results in a longitudinal concentration gradient within the bed at the end of the adsorption cycle (when the pressure within the bed equals the feed pressure). The helium concentration in the void spaces in the bottom section of the column is relatively high but decreases sharply reaching approximately the concentration of the feed in the upper section of the column. The bed space efficiency and the product concentration ratio can be increased and the product losses reduced if an even concentration of the enriched product in the void space could be secured. Since it is required to keep a high ratio of $L/D$ (adsorption column height to its diameter, 50–100 or more) in order to decrease the effect of longitudinal and radial mixing during the displacement part of the cycle the desired effect must be obtained by other means than adjusting the $L/D$ ratio of the adsorption column. A lateral direction of the feed flow combined with the downward direction of the displacement and desorption flows would satisfy the requirement of a low $L/D$ ratio during the adsorption step and high $L/D$ ratios during the displacement and desorption steps.

The concentration of the light component (e.g. helium) residing in the bed voids varies gradually in a parabolic manner from approximately feed concentration at the upper (entrance) section of the bed to a relatively high concentration in the bottom section. Such a concentration profile makes it difficult to pick up a most economical cut off point separating the enriched and the lean gas fractions during the product displacement stage of the cycle. A concentration profile with a sharp transition point between the light component rich and lean fractions of the gas would be advantageous for an optimum product recovery without recourse to recycling. Such a concentration profile can be developed when the feed gas is introduced into the adsorption bed in the lateral direction during the adsorption part of the cycle instead of along the longitudinal axis. The displacement part, however, must take place along the longitudinal axis to decrease the effect of longitudinal and radial mixing. The embodiment of the apparatus using the lateral feed techniques is represented on FIGURES 4a and 4b.

Figure 4A:
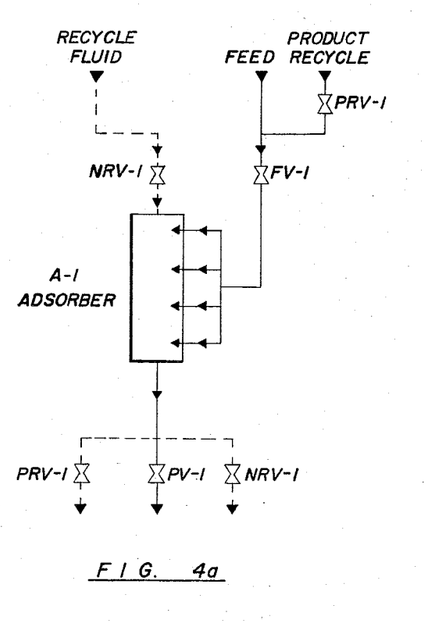

In the apparatus represented on FIGURE 4a the feed is introduced into the bed during the pressuring cycle laterally via valve FV-1 and the nozzles located at the side of the bed. The product recycle is introduced via the product recycle valve PRV-1 located upstream of the feed valve FV-1. During the displacement cycle the recycle fluid (e.g. nitrogen) is introduced through the recycle valve NRV-1 and the product is displaced via valve PV-1. The recycle fraction of the product is recycled via valve PRV-1, and the recycle nitrogen via valve NRV-1. The direction of the product displacement flow and the vent flow are thus downward through the bed.

Figure 4B:
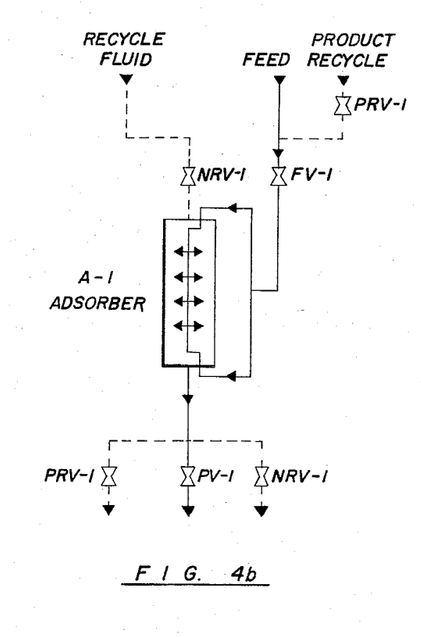

The apparatus represented on FIGURE 4b differs from that represented on FIGURE 4a by a different arrangement of the lateral feed nozzles. In FIGURE 4b feed is introduced into the adsorption bed through the lateral nozzles or openings in the vertical or coiled feed line located within said bed. In both cases the adsorber operating cycle and the sequence of the valve operation is identical with the standard cycle described above.

Another modification of the system takes advantage of the fact that all the adsorption columns operate at practically the same pressure. A central displacement fluid (e.g. recirculating nitrogen) storage system and/or a central enriched product recirculation system common to all the adsorption units of one stage or to all the stages and made up of a central heavy component (e.g. recirculating nitrogen) storage tank and/or recirculating product surge tank (see FIGURE 3) and the corresponding nitrogen and enriched product recirculation compressors and recirculation control valves may be used to replace individual recirculation compressors and storage tanks. This modification will decrease the number of components required by the recirculation gas storage system and the desorption equipment and will therefore decrease the equipment cost.

Another modification involves the use of liquid displacement fluids. Although the displacement of the light component enriched product is in general accomplished most economically in large scale industrial concentration units by the heavier (adsorbable) fraction of the feed specially recirculated for this purpose, the use of liquid displacement fluids such as mercury or nonwetting organic fluids may be justified in special cases in particular small scale laboratory apparatus.

Another modification involves the use of custom preformed shapes of solid adsorbents. Certain preformed shapes of the solid adsorbent other than granular, spherical or pelleted, e.g. rods, slabs, waffles or plates, may under special conditions decrease longitudinal and/or radial mixing during the product displacement part of the cycle and can be considered as beneficial in improving the concentration ratio per stage and decreasing product losses per stage. Due to the higher cost of the custom preformed shapes of the adsorbent the most economical application of said special forms of adsorbent would be in the higher concentration stages. Although the gas separation method subject of this invention is most economical for separation of components of a gaseous mixture characterized by a wide difference in their boiling points, it may under certain conditions (e.g. systems which do not lend themselves for easy separation by other methods, including isotopes, etc., special types of adsorbents) prove economical also for separation of components of a gaseous mixture having small difference in their respective boiling points.

While the direction of gas flow through the adsorbent bed in the above described process is essentially from top to bottom flow could be in the opposite direction however, upward flow through the bed could result in accelerated attrition of the adsorbent material due to the lifting and settling thereof under the influence of gas flow, pressure surges and the like.

It is understood that the embodiments of the invention, as herein described, are to be taken as presently preferred examples of the invention, and that various changes may be resorted to while still maintaining the spirit of the invention, and falling within the scope of the appended claims.

What we claim is:

1. A process for increasing the concentration of light components in a gaseous feed mixture, said mixture initially comprising heavy components and light components, said heavy components forming the major portion of the said feed mixture, said process comprising selective adsorption and removal of said heavy components by the steps of:
    establishing a bed zone of predetermined volume of preferentially heavy-component adsorbent material;
    introducing said gaseous feed mixture into said bed zone while exit therefrom is closed;
    preferentially adsorbing said heavy components in said bed, leaving said mixture in said bed zone enriched with respect to said light components;
    introducing a displacement gas into said bed zone and displacing said enriched mixture from said exit to a predetermined enriched mixture zone;
    maintaining pressure in said bed zone whereby said heavy components remain adsorbed in said bed during said displacing of said enriched mixture;
    subsequently removing said displacement gas from said bed zone reducing said pressure therein allowing desorption of said absorbed heavy components;
    continuing removal of said displacement gas and desorbing heavy components from said bed zone until said bed is regenerated for repetition of said process;
    and displacing said heavy components at least to a predetermined heavy-component zone discrete from said predetermined enriched mixture zone.

2. A process as in claim 1 wherein said displacement gas comprises desorbed heavy components introduced from said predetermined heavy component zone.

3. A process for increasing the concentration of light components in a gaseous feed mixture, said mixture intially comprising heavy components and light components, said heavy components forming the major portion of the said feed mixture, said process comprising selective adsorption and removal of said heavy components by the steps of:
    establishing a bed zone of predetermined volume of preferentially heavy-component adsorbent material;
    introducing said gaseous feed mixture into said bed zone while exit therefrom is closed;
    preferentially adsorbing said heavy components in said bed, leaving said mixture in said bed zone enriched with respect to said light components;
    introducing a displacement gas into said bed zone and displacing said enriched mixture from said exit to a predetermined enriched mixture zone; until a predetermined degree of enrichment of said enriched mixture effluent from said bed zone is attained;
    thereafter conducting enriched mixture effluent from said bed zone to a predetermined zone of lesser enrichment for preconcentration of said feed mixture;
    maintaining pressure in said bed zone whereby said heavy components remain adsorbed in said bed during said displacing of said enriched mixture;
    subsequently removing said displacement gas from said bed zone reducing said pressure therein allowing desorption of said adsorbed heavy components;
    continuing removal of said displacement gas and desorbing heavy components from said bed zone until said bed is regenerated for repetition of said process;
    and displacing said heavy components at least to a predetermined heavy-component zone discrete from said predetermined enriched mixture zone.

4. A process for increasing the concentration of light components in a gaseous feed mixture, said mixture initially comprising heavy components and light components, said heavy components forming the major portion of the said feed mixture, said process comprising selective adsorption and removal of said heavy components by the steps of:
    establishing at least three bed zones each of predetermined volume of preferentially heavy-component adsorbent material;
    introducing said gaseous feed mixture into a first said bed zone while exit therefrom is closed;
    preferentially adsorbing said heavy components in said first bed, leaving said mixture in said first bed zone enriched with respect to said light components;
    introducing a displacement gas into said first bed zone and displacing said enriched mixture from said exit thereof to a predetermined enriched mixture zone;
    maintaining pressure in said first bed zone whereby said heavy components remain adsorbed in said first bed during said displacing of said enriched mixture from said first bed zone;
    while thus displacing said enriched mixture from said first bed zone, introducing said gaseous feed mixture to a second said bed zone while exit therefrom is closed, preferentially adsorbing said heavy components in said second bed, leaving said mixture in said second bed zone enriched in respect of said light components;
    introducing a displacement gas into said second bed zone and displacing said enriched mixture from said exit thereof to a predetermined enriched mixture zone;
    maintaining pressure in said second bed zone whereby said heavy components remain adsorbed in said second bed during said displacing of said enriched mixture from said second bed zone;
    while thus displacing said enriched mixture from said second bed zone, introducing said gaseous feed mixture to a third said bed zone while exit therefrom is closed, preferentially adsorbing said heavy components in said third bed, leaving said mixture in said third bed zone enriched in respect of said light components;
    introducing a displacement gas into said third bed zone and displacing said enriched mixture from said exit thereof to a predetermined enriched mixture zone;

maintaining pressure in said third bed zone whereby said heavy components remain adsorbed in said third bed during said displacing of said enriched mixture from said third bed zone;

while thus displacing said enriched mixture from said third bed zone, removing said displacement gas from said second bed zone, reducing said pressure therein allowing desorption of said adsorbed heavy components;

continuing removal of said displacement gas and desorbing heavy components from said second bed zone until said second bed is regenerated for repetition of said process;

while thus removing said displacement gas and desorbing heavy components from said second bed zone for regeneration of said second bed, introducing fresh gaseous feed mixture into said first bed zone to commence a repetition of said process in the now regenerated said first bed;

and displacing at least said heavy components from said beds to a predetermined heavy-component zone discrete from said predetermined enriched mixture zone.

5. A process for increasing the concentration of light components in a gaseous feed mixture, said mixture initially comprising heavy components and light components, said heavy components forming the major portion of the said feed mixture, said process comprising selective adsorption and removal of said heavy components by the steps of:

establishing a bed zone of predetermined volume of preferentially heavy-component adsorbent material;

introducing said gaseous feed mixture from a source into said bed zone while exit therefrom is closed; allowing said bed zone to equalize pressure with said source;

preferentially adsorbing said heavy components in said bed at the prevailing temperature of said source, leaving said mixture in said bed zone enriched with respect to said light components;

introducing a displacement gas into said bed zone and displacing said enriched mixture from said exit to a predetermined enriched mixture zone until a predetermined degree of enrichment of said enriched mixture effluent from said bed zone is attained;

maintaining said pressure and temperature in said bed zone whereby said heavy components remain adsorbed in said bed zone during said displacing of said enriched mixture;

subsequently removing said displacement gas from said bed zone reducing said pressure therein allowing desorption of said adsorbed heavy components;

continuing removal of said displacement gas and desorbing heavy components from said bed zone until said bed is regenerated for repetition of said process;

and displacing said heavy components at least to a predetermined heavy-component zone discrete from said predetermined enriched mixture zone.

6. A process as in claim 5 wherein said displacement gas comprises desorbed heavy components introduced from said predetermined heavy-component zone.

7. A process for increasing the concentration of light components in a gaseous feed mixture, said mixture initially comprising heavy components and light components, said heavy components forming the major portion of the said feed mixture, said process comprising selective adsorption and removal of said heavy components by the steps of:

establishing a bed zone of predetermined volume of preferentially heavy-component adsorbent material;

introducing said gaseous feed mixture from a source into said bed zone while exit therefrom is closed, allowing said bed zone to equalize pressure with said source;

preferentially adsorbing said heavy components in said bed at the prevailing temperature of said source, leaving said mixture in said bed zone enriched with respect to said light components;

introducing a displacement gas into said bed zone and displacing said enriched mixture from said exit to a predetermined enriched mixture zone until a predetermined degree of enrichment of said enriched mixture effluent from said bed zone is attained;

thereafter conducting enriched mixture effluent from said bed zone to a predetermined zone of lesser enrichment for preconcentration of said feed mixture;

maintaining said pressure and temperature in said bed zone whereby said heavy components remain adsorbed in said bed during said displacing of said enriched mixture;

subsequently removing said displacement gas from said bed zone reducing said pressure therein allowing desorption of said adsorbed heavy components;

continuing removal of said displacement gas and desorbing heavy-components from said bed zone until said bed is regenerated for repetition of said process;

and displacing said heavy components at least to a predetermined heavy-component zone discrete from said predetermined enriched mixture zone.

8. The process of claim 5 wherein the ratio of length of said bed over the diameter of said bed is between about 50 and about 100.

9. The process of claim 5 wherein the ratio of length of said bed over the diameter thereof is between about 50 and about 100 and wherein said gaseous feed mixture is introduced into substantially the top of said bed zone while exit therefrom is closed and said enriched mixture residing in the bed zone is withdrawn from said exit at substantially the bottom of said bed zone.

10. The process of claim 5 wherein the ratio of length of said bed over the diameter thereof is between about 50 and about 100 and wherein said gaseous feed mixture is introduced laterally into said bed while exit therefrom is closed, from at least one point along a side thereof and said enriched mixture residing in the bed zone is withdrawn from said exit at the bottom of said bed zone.

11. The process of claim 5 wherein the ratio of length of said bed over the diameter thereof is between about 50 and about 100 and wherein said gaseous feed mixture is introduced laterally into said bed while exit therefrom is closed, from at least one point along substantially the longitudinal axis of said bed and said enriched mixture residing in the bed zone is withdrawn from said exit at the bottom of said bed zone.

12. A process according to claim 5 including the step of prepurifying said gaseous feed mixture to remove liquids and long chain gaseous hydrocarbon contaminants therefrom prior to introducing said feed mixture into said bed.

13. The process according to claim 5 wherein the operating pressure is between about 200 p.s.i.g. and about 2000 p.s.i.g.

14. The process according to claim 5 wherein said adsorption of said heavy components is accomplished at temperatures between about 200° F and about −40° F.

15. The process according to claim 5 wherein said displacement gas is a non-wetting, non-adsorbable fluid.

16. The process according to claim 5 wherein said displacement gas is said gaseous feed mixture.

17. The process according to claim 5 wherein the elapsed time from introduction of said gaseous feed mixture into said bed to completion of regeneration of said bed is from 10 to 60 minutes.

18. The process according to claim 5 wherein said gaseous feed mixture is naturally occuring gas from underground gas wells.

19. The process according to claim 5 wherein the major proportion of the light components in said gaseous feed mixture is helium.

20. The process according to claim 5 wherein the major proportion of the light components in said gaseous feed mixture is hydrogen.

21. The process according to claim 5 wherein the major proportion of the light components in said gaseous feed mixture is neon.

22. The process according to claim 5 wherein the light components in said gaseous feed mixture consist primarily of helium, hydrogen and neon.

References Cited by the Examiner

UNITED STATES PATENTS

| | | | |
|---|---|---|---|
| 2,901,519 | 8/1959 | Patterson et al. | 55—75 X |
| 3,085,379 | 4/1963 | Kiyonaga et al. | 55—62 |
| 3,130,021 | 4/1964 | Milton | 55—33 |

FOREIGN PATENTS 860,311  2/1961  Great Britain.

REUBEN FRIEDMAN, *Primary Examiner.*